United States Patent Office 3,808,149
Patented Apr. 30, 1974

3,808,149
REFRIGERATION OIL ACID TEST SOLUTION
AND METHOD
Leonard C. Ellis, Chesapeake, and Mearl A. Kise, Portsmouth, Va., assignors to Virginia Chemicals, Inc., Portsmouth, Va.
No Drawing. Filed Apr. 17, 1972, Ser. No. 244,941
Int. Cl. G01n 33/00
U.S. Cl. 252—408                                    2 Claims

ABSTRACT OF THE DISCLOSURE

This is a single vial test kit, in which there is only one solution, for testing acidity in refrigeration and/or air conditioning oils and similar compositions. The testing solution described herein is characterized by certain colors. After only one brief direct mixing step in the testing, the degree of acidity of the refrigeration oil is easily detected by observing the change in color of the mixture.

A method of producing the described testing solution is taught herein, as well as a procedure of utilizing this solution in testing refrigeration oils.

BACKGROUND OF THE INVENTION

In the past it has been known to test refrigeration oils and similar compositions by the use of as few as two vials, to determine the acidity of the refrigeration oil. The most popular multi-vial acid testing apparatus, known as Sporlan's "One Time Acid Test Kit," consists in part of a two fluid ounce vial, containing an acid-base indicator in a benzene-ethyl alcohol media. A second, somewhat smaller vial, contains an alcoholic potassium hydroxide solution in benzene. According to this normal test procedure, the contents of the smaller vial are emptied into the larger vial, producing a certain color. The then empty vial, which also is used as a measuring vial, is filled with the test oil and finally emptied into the larger vial. If the color of the resulting homogeneous mixture remains the same for a period of time, the oil is then considered to be in satisfactory condition.

In other known systems and solutions, such as for example, the multivial Henry's "Unikit," a two-phase system occurs in the final mixture. It is quite difficult to determine accurately the true color in such two-phase systems without a certain waiting period, which is generally accepted as from five to fifteen minutes for the phases to separate adequately for accurate color determination.

Not only are the multi-vial systems of the art time consuming, they also tend to lead to loss of active ingredients during transfer thereof from one vial to another. Loss of potassium hydroxide by reaction with carbon dioxide in the air may cause the tested oil to fail the color test althogether.

The present invention on the other hand comprises a simplified system of testing, using less equipment and actually reducing the margin of test error while accelerating the test result.

DESCRIPTION OF THE PREFERRED EMBODIMENTS

This is a stable composition for testing refrigeration oils which consists essentially of approximately a trace amount of metal hydroxide in admixture with substantially equal parts of benzene and alcohol, together with trace amounts of phenol red indicator solution and deaerated water, brought together in an inert atmosphere. This invention encompasses a method of making and storing the solution of metal hydroxide, benzene and the alcohol with an acid-base indicator, a heretofore unreliable solution which was marked by instability and short life span.

EXAMPLE 1

Initially, a first solution was formed in an inert atomsphere of nitrogen, comprising 827 milliliters or 650 grams of absolute ethyl alcohol, 30.5 milliliters or 26 grams of benzene, and 29 milliliters or 29 grams of water and 3.25 milliliters or 3.318 grams of 1.021 N potassium hydroxide. Care was taken during the preparation of this mixture not to expose the solution to carbon dioxide. The percentage by volume composition of this solution as calculated from the above quantities of its constituents, is approximately 3.43% benzene, 3.26% water, 0.365% potassium hydroxide, and 92.947% absolute ethyl alcohol.

Next, a second solution was prepared by dissolving 1.0 gram of phenol red in 70 milliliters of absolute ethyl alcohol, and then adding approximately 29 milliliters or sufficient deaerated water to this mixture to make 100 milliliters of solution. 10.85 grams or approximately 11.6 milliliters of this phenol red indicator solution were then mixed with 3.64 liters of benzene, and 3.110 liters of absolute ethyl alcohol. The pH of this solution was adjusted to within the range of 8.5 to 9.0 with the addition of 1.0 N potassium hydroxide. In the various experiments and tests run, it was found that at a maximum, only 1 drop was sufficient to maintain this basic range in pH. The percentage by volume composition of this solution, as calculated from the above quantities of its constituents, is approximately 53.8% benzene, 46.0% absolute ethyl alcohol, 0.172% phenol red solution, and 0.028% potassium hydroxide.

Finally, 644 milliliters or approximately 517.0 grams of the first solution were added to the second solution, under conditions which as much as possible prevented air exposure. 43.8 milliliters of this final solution were then charged into two ounce test vials which were contained in an inert atmosphere of nitrogen. The combined test solution is purple in color. The percentage by volume composition of the test solution made in accordance with this example, as calculated from the above quantities of of constituents, is approximately 0.1566% phenol red solution 49.449% benzene, 50.076% alcohol, 0.283% water and 0.0344% potassium hydroxide.

Of course, the specific quantities described in this description are given by way of example to illustrate the relative proportions of the preferred embodiment. These quantities may be uniformly varied, depending upon the quantity of this solution which is desired. These quantities, in their relative proportions to one another, should not be considered absolutely critical in that slight variations of the relative quantities can be tolerated to achieve the same satisfactorily stable, desired solution.

EXAMPLE 2

In an experimental run, sufficient solution for a thousand test kits was produced. 13.83 milliliters of 1.021 N potassium hydroxide was mixed with 21.928 liters of benzene, 22.144 liters of absolute ethyl alcohol, 0.174 liter of deaerated water and 78.4 milliliters of phenol red indicator solution. The percentage by volume composition of the test solution in this example, as calculated from the above quantities of its constituents, is approximately 0.0312% potassium hydroxide, 49.460% benzene, 49.940% alcohol, 0.1768% phenol red solution and 0.392% deaerated water.

Each test vial, of which each test kit contained one, was then changed with 43.8 milliliters of this combined mixture, each step being carried out carefully under an inert atmosphere of nitrogen. After filling, the vials were tightly sealed and stored in a dark environment until ready for actual use.

Storage tests storing the solution so described at temperature 120° F. for four months have been made. The results of this test show that the solution is stable.

It is important when varying the relative quantities or ratios, however, that a two-phase system not be achieved. A two-phase system, as described, can increase the time factor in the use of the solution and decrease the accuracy and efficiency of the test.

It has been found that equivalent amounts of sodium hydroxide may be substituted for potassium hydroxide in each of the above-mentioned steps. But in any event, the ratio of milligrams of metal hydroxide to grams oil tested is critical in order to maintain a constant neutralization number.

While in the aforementioned process 1.021 N potassium hydroxide was used, it is perfectly satisfactory to use 1.0 N potassium hydroxide. In order to keep the relative number of hydroxide ions in the solution, which is critical insofar as the use of the solution in testing refrigeration oils is concerned, it will be necessary to keep the weights of substitute for 1.021 N potassium hydroxide very closely equal to the weight of 1.021 N potassium hydroxide used. Combinations of more than one metal hydroxide may be made as a suitable substitute for 1.021 N potassium hydroxide, bearing in focus the necessity for an equality of weight with the 1.021 N potassium hydroxide. Whenever the metal hydroxide is changed, a compensating change in the quantity of water must also be made, the quantity of water also being critical insofar as the use of the solution in testing refrigeration oils is concerned.

The benzene may be substituted by toluene (methylbenzene), or xylenes (dimethyl benzenes). Additionally, isopropyl alcohol could be substituted for ethyl alcohol in these steps.

TESTING OILS WITH THE TEST SOLUTION

In the actual practice using the method of testing oils, such as refrigeration oils, with this test solution, the prepared test solution is originally characterized by a purple color. An especially designed two ounce test vial is charged with 43.8 milliliters of this final test solution. The refrigeration oil to be tested is poured into the two ounce test vial so that the combined mixture of these two components fills the vial to a point just above its shoulder. The amount of refrigeration oils so mixed corresponds to approximately 16.8 milliliters or 15.5 grams, an amount carefully calculated to correspond to the amount of metal hydroxide present in the test vial solution. In using the test solutions of this invention, it is therefore important that approximately 2.61 times as much test solution be mixed with a given volume of oil to properly correlate the amount of hydroxide in the test solution with the volume of oil to be tested. The oil and test solution are shaken together. The mixture formed upon the addition of the refrigeration oil to be tested to the test vial solution, when shaken, is homogeneous, thus allowing one to obtain an accurate and reliable determination of the color after only a few seconds. If the refrigeration oil contains an acid number less than 0.05, the color of the test solution will be observed as within a color spectrum of purple to red. If, on the other hand, the color of the test solution changes to orange, the test oil should be considered acidically borderline, suggesting that the oil be changed. If the color of the test vial should change to yellow, the oil is definitely too acidic, i.e. above acid number 0.05, and should be changed without question.

The amounts given in this description of a method for testing oils should be considered as illustrative of the relative quantities of solution and oil being tested. Of course, the proportions of the components may be uniformly increased or decreased to suit the desired end.

We claim:

1. A stable composition of matter for testing refrigeration oils, consisting by volume of from 49.940 to 50.076% of an alcohol from the group consisting of absolute ethyl and isopropyl alcohol; from 49.449 to 49.460% of a liquid from the group consisting of benzene, methyl benzene, and dimethyl benzene; from 0.283 to 0.392% deaerated water; from 0.0312 to 0.0344% of a metal hydroxide from the group consisting of sodium and potassium hydroxide; and from 0.1566 to 0.1768% phenol red indicator solution.

2. A method of testing the acidity of refrigeration oil comprising the steps of:
(A) providing a sample volume of the oil to be tested;
(B) mixing the sample volume of oil with a sufficient quantity of a test solution to produce a visual color change in proportion to the acidity of the sample of oil, the test solution consisting by volume of from 49.940 to 50.076% of an alcohol from the group consisting of absolute ethyl and isopropyl alcohol; from 49.449 to 49.460% of a liquid from the group consisting of benzene, methyl benzene, and dimethyl benzene; from 0.283 to 0.392% deaerated water; from 0.0312 to 0.0344% of a metal hydroxide from the group consisting of sodium and potassium hydroxide; and from 0.1566 to 0.1768% phenol red indicator solution;
(C) observing the color of the resulting mixture to determine its acidity.

References Cited

UNITED STATES PATENTS

| | | | |
|---|---|---|---|
| 3,030,190 | 4/1962 | Seemaan et al. | 23—230 HC |
| 2,770,530 | 11/1956 | Bergstrom et al. | 23—230 HC |
| 2,953,439 | 9/1960 | Elliott et al. | 23—230 HC |

OTHER REFERENCES

U.S. Govt. Master Specification for Lubricants and Liquid Fuels, 1927, p. 90.

LEON D. ROSDOL, Primary Examiner

J. WARE, Assistant Examiner

U.S. Cl. X.R.

23—230 HC